Patented Oct. 23, 1951

2,572,728

UNITED STATES PATENT OFFICE 2,572,728

HYDROXYBENZENESULFONAMIDOPYRA-ZINES AND PREPARATION OF SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application January 7, 1949, Serial No. 69,828

5 Claims. (Cl. 260—250)

This invention relates to new and useful sulfonamides and to methods of preparing the same.

This application is a continuation-in-part of application Serial No. 25,524 filed May 6, 1948, entitled Hydroxysulfonamides and Preparation of the Same.

It has been discovered that certain p-hydroxybenzenesulfonamidopyrazines possess unexpected anti-viral activity, particularly against the neurotropic virus diseases and may, therefore, become important drugs in the treatment of these and related diseases. The new compounds of the present invention may be represented by the general formula:

in which R represents hydrogen or an aliphatic or aralkyl radical, Pyz represents a pyrazine radical attached to the amide nitrogen by a carbon-nitrogen linkage and R' represents hydrogen or an acyl group. The pyrazine radical may bear one or more substituent radicals at the remaining position such as aliphatic, aromatic, aralkyl, carboxy, halogen and amino radicals, and the like, or it may form a part of a condensed ring system.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased. Obviously such salts are included with the scope of the present invention.

The new p-hydroxybenzenesulfonamidopyrazines may be prepared by several distinct methods, the more important of which will be described in the specific examples which follow. The preferred method is by the hydrolysis of a suitable ester of a p-hydroxybenzenesulfonamidopyrazine under either acidic or alkaline conditions whereby the —OH group is formed in the reaction. These esters which have the general formula

R' being an acyl radical, are believed to be new and are intended to be included within the scope of the invention. These esters are valuable per se as drugs since they may be hydrolyzed in the system.

To prepare the new acyl compounds of the present invention several methods are available. A preferred method involves the condensation of an appropriate benzene sulfonyl halide with an aminopyrazine in accordance with the following equation:

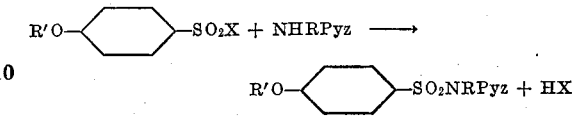

In the above R' is an acyl radical such as benzoyl, acetyl, furoyl, tosyl, carbethoxy or the like which may later be removed by hydrolysis. X is a halogen, preferable chlorine, but if desired fluorine or bromine. Pyz is a pyrasinyl radical such as mentioned above attached by a carbon atom of the pyrazine ring.

To prepare intermediates in which R is an organic radical of the kind mentioned above, secondary amines such as 2-N-(beta-hydroxyethyl)-aminopyrazine, 2-(N-methylamino) pyrazine, 2-(N-benzylamino) pyrazine and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O— to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and a slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxides, ammonia and the like may also be used. Conversion of the group R'O to HO— can also be effected by hydrolysis under acidic conditions using hydrochloric acid, sulfuric acid or other known acid hydrolyzing agents.

The time for completion of the hydrolysis depends on several factors including the temperature, the concentration of the hydrolyzing agent, the nature of the compounds, etc. Using, for example, sodium hydroxide at 10%–20% concentration and at a temperature of 75° to 100° C., the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

Another distinct method of preparing the compounds of the present invention involves the use as starting material one of the known p-aminobenzenesulfonamidopyrazines. This process involves diazotization of the p-amino group on the benezene ring followed by decomposition of the diazo compound under carefully controlled conditions so that a hydroxy group is formed. In general, the diazotization is carried out in the customary manner at 0° to 25° C. in 5% to 20% sulfuric acid, using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of representative p-hydroxybenzenesulfonamidopyrazines in the following examples. All parts are by weight unless otherwise indicated.

Example 1

Ten parts of 2-aminopyrazine is added to 50 parts of dry pyridine, and the resulting slurry is cooled in an ice salt bath to 0° C. Twenty-seven parts of 1 - carbethoxyoxybenzene - 4 - sulfonyl chloride is added, and the mixture stirred for fifteen minutes at 0°–10° C. The solution is then poured into 500 parts of water, and the resulting product is dissolved by the addition of 100 parts of 20% sodium hydroxide solution. The solution is then steam-stripped until all of the pyridine is removed. The pyridine-free solution is treated with decolorizing carbon, clarified and made slightly acid with acetic acid. The crude product, which precipitates as a cream colored crystalline powder, is filtered off, washed and dried at 50° C. Yield, 8 parts with a melting range of 240°–241° C. Purification of the crude product is brought about by dissolving it in dilute caustic, treating the solution with decolorizing carbon, clarifying and precipitating with acetic acid. In this way, the pure N-(2-pyrazinyl)-1-phenol-4-sulfonamide is obtained as a white product with a melting range of 243.0°–243.8° C. with decomposition.

| Analysis | C | H | N | S |
|---|---|---|---|---|
| Calculated for $C_{10}H_9N_3O_3S$ | 47.8 | 3.58 | 16.7 | 12.7 |
| Found | 48.0 | 3.33 | 16.7 | 12.6 |

Example 2

23.5 parts of 2-aminoquinoxaline is added to 49 parts of a 30% picoline in pyridine mixture and 56.2 parts of 4-tosyloxybenzenesulfonyl chloride is added gradually keeping the temperature under 30° C. The resulting mixture is set aside for several days. 250 parts of water is added and the product is heated to 95–100° C. for 45 minutes. The solid obtained is filtered and washed with water after cooling to 10° C. The product obtained is dried at 100° C. It is slurried in 164.4 parts of 10% sodium hydroxide and heated to 95–100° C. for 45 minutes. The solution which is obtained is treated with 2.3 parts of activated carbon, filtered, and the product precipitated by the addition of hydrochloric acid to pH 3. The precipitate is filtered off, washed and then dissolved with a minimum of sodium hydroxide in 400 parts of water. The solution is treated with 2.3 parts of activated carbon, filtered and the product precipitated by the addition of hydrochloric acid to pH 3. This precipitation is repeated twice more and the light cream colored product which is obtained is dried at 100° C. It is dissolved in a minimum of hot methyl alcohol, treated with activated carbon, filtered, and the filtrate cooled to 10° C. The crystalline product obtained is dried at 110° C. It melts at 232.5–234.5° C.

| Analysis | C | H | N | S |
|---|---|---|---|---|
| Calculated for $C_{14}H_{10}N_3O_3S$ | 55.99 | 3.36 | 13.99 | 10.68 |
| Found | 56.0 | 3.41 | 14.0 | 10.7 |

Example 3

Twenty-five parts of 2-amino-5,6-dimethylpyrazine (M. P. 146–148) is suspended in 100 parts by volume of dry pyridine. 4-(p-Toluenesulfonyloxy) benzenesulfonyl chloride, 70 parts (M. P. 82–84) is then added in portions with stirring and cooling so that the temperature of the reaction mixture remains in the range of 35–45° C. The resulting clear, red solution is allowed to stand over night at room temperature during which time it sets to an almost solid mass. This is diluted with 250 parts of water and the whole poured on 1000 parts of flake ice. The resulting pink precipitate is filtered off, washed with water and dried at 50°. This crude intermediate compound, 40 parts, is hydrolyzed to the desired product by refluxing with 300 parts of 7% sodium hydroxide solution for 1 hour. The resulting clear, pale yellow solution is decolorized with activated charcoal, clarified and acidified with 20% acetic acid whereupon N-(5,6-dimethyl-2 - pyrazinyl) - 1 - phenol - 4 - sulfonamide precipitates in the form of a white, crystalline powder which is filtered off, washed and dried at 50°. The material so obtained has a melting range of 226–227.5° C.

| Analysis | C | H | N | O | S |
|---|---|---|---|---|---|
| Calculated for $C_{12}H_{13}N_3O_3S$ | 51.59 | 4.69 | 15.05 | 17.18 | 11.48 |
| Found | 51.5 | 4.80 | 15.1 |  | 11.4 |

In accordance with the above disclosed method other hydroxysulfonamido-pyrazines can be prepared such as N-(3,5-dimethyl-2-pyrazinyl)-1-phenol-4-sulfonamide, N-(5-ethyl-2-pyrazinyl)-1-phenol-4-sulfonamide, N-(5,6-diphenyl-2-pyrazinyl)-1-phenol-4-sulfonamide; N-(5-carboxy- 2-pyrazinyl)-1-phenol-4-sulfonamide, N-(5,6-dicarboxy-2-pyrazinyl)-1 - phenol - 4 - sulfonamide, N-(6-methyl-2-quinoxalyl)-1-phenol-4-sulfonamide, N-(5-chloro-2-pyrazinyl)-1-phenol-4-sulfonamide using as intermediates the appropriate 2-amino-pyrazine.

What is claimed is:
1. Compounds having the formula

wherein $R_1$ is a member of the group consisting of hydrogen and acyl radicals and Pyz represents a radical selected from the group consisting of pyrazinyl radicals and quinoxalyl radicals, and salts of said compounds with a cation.

2. A compound represented by the formula

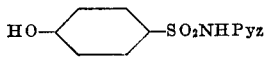

in which Pyz is a pyrazinyl radical.

3. N-(2-pyrazinyl)-1-phenol-4-sulfonamide.
4. N-(2-quinoxalyl)-1-phenol-4-sulfonamide.
5. N-(5,6-dimethyl-2-pyrazinyl)-phenol-4-sulfonamide.

MARTIN E. HULTQUIST.
ALOYSIUS J. BRYANT,
Administrator Estate of Yellapragada SubbaRow, Deceased.

REFERENCES CITED

The following references are of record in the file of this patent:

Weislogle, Survey of Antimalarial Drugs, vol. 2, part 2, pages 1446 and 1466, J. W. Edwards, Ann Arbor, Mich. (1946).

Beilstein, Handbuch der Organische Chemie, Vierte Auflage, vol. 11, page 243 and vol. 6, page 153 (1923).

Kermack et al., J. Chem. Soc. (London) 1939, pp. 608–610.